UNITED STATES PATENT OFFICE.

KARL ELBEL AND IGNAZ ROSENBERG, OF BIEBRICH, GERMANY, ASSIGNORS TO KALLE AND COMPANY, OF SAME PLACE.

BLACK TRISAZO DYE AND PROCESS OF MAKING SAME.

SPECIFICATION forming part of Letters Patent No. 671,543, dated April 9, 1901.

Application filed December 1, 1900. Serial No. 38,341. (Specimens.)

*To all whom it may concern:*

Be it known that we, KARL ELBEL, a subject of the King of Prussia, Emperor of Germany, and IGNAZ ROSENBERG, a subject of the Emperor of Austria-Hungary, doctors of philosophy, both residing at Biebrich-on-the-Rhine, Germany, (assignors to KALLE AND COMPANY, of same place,) have invented certain new and useful Improvements in the Manufacture of a Black Trisazo Dye, of which the following is a specification.

Our invention relates to the manufacture of valuable black trisazo dyestuffs having the general formula—

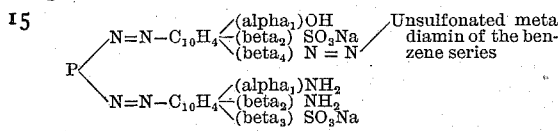

in which formula P stands for para phenylene diamin and paradiamido diphenylamin.

The new process consists in preparing the tetrazo compound of the intermediate product obtained by combining one molecule of para diamin with one molecule of gamma amidonaphthol sulfonic acid in alkaline solution and combining the said tetrazo compound first with one molecule of an unsulfonated meta diamin of the benzene series and afterward with one molecule of alpha$_1$ beta$_2$ naphtylene diamin beta$_3$ sulfonic acid.

In the following we describe the method employed in producing the dyestuff derived from paradiamido diphenylamin.

The tetrazo solution obtained in the usual manner from twenty kilos paradiamido diphenylamin is rendered alkaline with sodium carbonate and mixed with an alkaline solution of twenty-four kilos gamma amidonaphthol sulfonic acid. When the formation of the intermediate product is finished, we add seven kilos of nitrite to the combination liquid and run it into an excess of hydrochloric acid previously diluted with ice-water. The diazotation being finished, a solution of 12.2 kilos meta toluylene diamin is added. The liquid is then gradually neutralized by adding a solution of sodium carbonate. The combination of the metatoluylenediamin being finished, an excess of soda and an alkaline solution of twenty-five kilos alpha$_1$ beta$_2$ naphtylene diamin beta$_3$ sulfonic acid are added. After stirring the combination mass for several hours the new dyestuff is precipitated by addition of salt, filtered, pressed, and dried. It represents a dark-colored powder with a metallic luster. In water and concentrated sulfuric acid it is soluble with bluish-black color. In alcohol it is insoluble. In its aqueous solutions hydrochloric acid causes a black precipitate. It dyes fast-black shades on unmordanted cotton from an alkaline-salt bath.

Now what we claim is—

1. The process of manufacturing new trisazo dyestuffs having as sodium salt the general formula

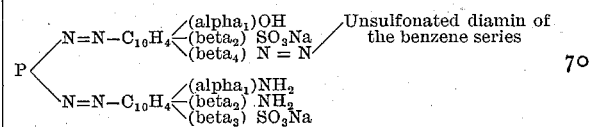

consisting in rediazotizing the intermediate product from one molecule of para diamin and one molecule of gamma amidonaphthol sulfonic acid and combining the so-obtained tetrazo compound first with one molecule of an unsulfonated meta diamin of the benzene series and afterward with one molecule of alpha$_1$ beta$_2$ naphtylene diamin beta$_3$ sulfonic acid.

2. The process of manufacturing the special new trisazo dyestuff having as sodium salt the formula

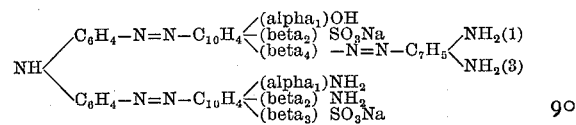

consisting in rediazotizing the intermediate product, obtained by combining one molecule of tetrazodiphenylamin and one molecule of gamma amidonaphthol sulfonic acid in alkaline solution, and by acting on the soproduced tetrazo compound first with one molecule of metatoluylenediamin and afterward with one molecule of alpha₁ beta₂ naphtylene diamin beta₃ sulfonic acid.

3. The new trisazo dyestuffs, obtainable by acting on the rediazotized intermediate products of the general formula,

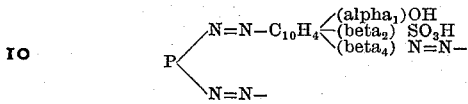

first with one molecule of an unsulfonated meta diamin of the benzene series and subsequently with one molecule of alpha₁ beta₂ naphtylene diamin beta₃ sulfonic acid, representing as sodium salts dark-colored powders of metallic luster easily soluble in water and concentrated sulfuric acid with bluish-black color, insoluble in alcohol, being precipitated from their aqueous solutions by means of hydrochloric acid as black powders, dyeing fast-black shades on unmordanted cotton from an alkaline-salt bath.

4. The special new trisazo dyestuff having as sodium salt the formula

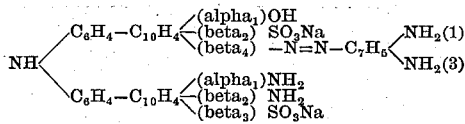

representing a dark-colored powder showing metallic luster, easily soluble in water and concentrated sulfuric acid with bluish-black color, insoluble in alcohol, being precipitated from its aqueous solutions as black powder by addition of hydrochloric acid, dyeing a fast black on unmordanted cotton from an alkaline-salt bath.

In testimony whereof we have signed our names to this specification in the presence of two subscribing witnesses.

KARL ELBEL.
IGNAZ ROSENBERG.

Witnesses.
JEAN GRUND,
CARL GRUND.